US005746958A

United States Patent [19]

Gustafsson et al.

[11] Patent Number: 5,746,958

[45] Date of Patent: May 5, 1998

[54] METHOD OF PRODUCING A WOOD-THERMOPLASTIC COMPOSITE MATERIAL

[75] Inventors: Kjell-Ake Gustafsson, Binghamton, N.Y.; John J. Muller, Winchester, Va.; Roger A. Wittenberg, Newtown, Pa.

[73] Assignee: Trex Company, L.L.C., Winchester, Va.

[21] Appl. No.: 413,758

[22] Filed: Mar. 30, 1995

[51] Int. Cl.$^6$ ............................ B29B 9/12; B29C 47/00

[52] U.S. Cl. ................ 264/115; 264/122; 264/DIG. 69; 524/13

[58] Field of Search ............................ 264/122, 115, 264/DIG. 69, 118; 524/13

[56] References Cited

U.S. PATENT DOCUMENTS

| | | | |
|---|---|---|---|
| 3,888,810 | 6/1975 | Shinomura | 260/17.4 |
| 4,056,591 | 11/1977 | Goettler et al. | 264/108 |
| 4,225,640 | 9/1980 | Erb | 428/2 |
| 4,228,116 | 10/1980 | Colombo et al. | 264/119 |
| 4,791,020 | 12/1988 | Kokta | 428/326 |
| 4,968,463 | 11/1990 | Levasseur | 264/40.1 |
| 5,075,057 | 12/1991 | Hoedl | 264/115 |
| 5,082,605 | 1/1992 | Brooks et al. | 264/40.6 |
| 5,088,910 | 2/1992 | Goforth et al. | 425/142 |
| 5,217,655 | 6/1993 | Schmidt | 264/22 |
| 5,268,074 | 12/1993 | Brooks et al. | 162/4 |
| 5,480,602 | 1/1996 | Nagaich | 264/122 |

FOREIGN PATENT DOCUMENTS 149481 3/1980 Germany .

OTHER PUBLICATIONS

Interrogatories to the Jury, Mobil Oil Corp., Plaintiff, v. Advanced Environ. Recycling Technologies, Inc., Defendant.

Polymer Extrusion, C. Rauwendaal, Hanser Publishers, 1986, pp. 28, 69–71, 168–169, 452–453.

Plastic Extrusion Technology Handbook, Levy, 1981, pp. 55, 90–106, 111, 152–153.

Plastics Waste, Leidner, 1981, pp. 28–29, 90–91, 148.

The Redmar Process, Hearthbrite Industries.

Plastics Extrusion Technology & Theory, Schenkel, pp. 220–223.

*Primary Examiner*—Mary Lynn Theisen

*Attorney, Agent, or Firm*—Rhodes Coats & Bennett, L.L.P.

[57] ABSTRACT

A method is disclosed for producing a wood-thermoplastic composite material using a high bulk density feedstock. The feedstock is formed by feeding a wood-thermoplastic mixture to a pellet mill where the bulk density thereof is increased by a significant amount. The pelletized feedstock may be stored for later formation into a finished product and may be blended as necessary to maintain product quality. The feedstock is easy to handle and transport and provides a manufacturer with a large degree of flexibility and control over the manufacturing process.

21 Claims, 3 Drawing Sheets

METHOD OF PRODUCING A WOOD-THERMOPLASTIC COMPOSITE MATERIAL

FIELD OF THE INVENTION

The invention relates to a method of producing a wood/thermoplastic composite characterized by converting a low bulk density mixture of a wood component and a thermoplastic component into a stable, easily transportable, storable high bulk density feedstock. The feedstock is easy to handle and store and can be fed directly into processing equipment. The use of the feedstock greatly increases manufacturing flexibility in making a wood-thermoplastic composite material.

BACKGROUND OF THE INVENTION

Composite materials consisting of a mixture of wood particles in the form of sawdust and a thermoplastic material have been known for many years. The materials so formed may be used in many of the same applications as an all wood product but offer the advantages of providing high resistance to rot, insects and moisture. These products can have the same workability as wood and are splinter-free. However, these materials do not exhibit the same physical characteristics as wood and therefore may not be used as structural members in some applications. The recent past has seen increased interest in composite material manufacture as a viable outlet for recycled post consumer thermoplastic materials. This interest has been spurred by the prospect of environmental regulations mandating the recycling of these materials. Also valuable, ever shrinking landfill space may be conserved if both spent sawdust and plastic material are reused rather than disposed.

The manufacturer of wood/thermoplastic composites is faced with the need to convert two components having a large disparity in bulk density into a much higher bulk density form suitable for a high volume manufacturing process such as extrusion or injection molding. In order to fully understand the challenges presented during processing these materials, an understanding of the concept of bulk density is required. The bulk density of a material is the weight of a quantity of that material divided by the volume that the quantity occupies. It is determined by filling a container or certain volume with the bulk material without applying pressure or any agitation such as by tapping. The content is then weighed and the bulk density is obtained by dividing the material weight by the volume. In order to obtain reproducible results, the dimensions of the container should be several orders of magnitude larger than the particle dimensions. Materials with irregularly shaped particles tend to have a low bulk density and can easily cause solids conveying problems.

The thermoplastic component used to make the composite products of the present invention are an almost ideal low bulk density material. This component is comprised of individual flakes which are very lightweight, irregularly shaped and take up large volumes for a given weight. They can be difficult to transport efficiently and at low cost. In this context transport refers to the movement of the thermoplastic component within a manufacturing facility from one processing step to another typically by either being conveyed by compressed air through a large tube or screw conveyor. Even after combining the two components, there remain problems with increasing the bulk density of the wood-thermoplastic mixture sufficiently for use in an extruder. As will be well appreciated by those of ordinary skill in the art of composite materials extrusion, high volume extruders must be fed a minimum volume of a continuous stream of product. Prior art processes described in the patents listed herein below have focused on heating and mixing the wood/thermoplastic mixture to form a dense agglomeration. These processes typically require very energy intensive equipment to heat and in some cases exert great pressure on the agglomeration to form a finished product.

| Patent | Inventor |
|---|---|
| 3,888,810 | Shinomura |
| 4,056,591 | Goettler |
| 4,225,640 | Erb |
| 4,968,463 | Levasseur |
| 5,082,605 | Brooks, et al. |
| 5,088,910 | Goforth, et al. |
| 5,217,655 | Schmidt |
| 5,268,074 | Brooks, et al. |

A typical commercial embodiment of these prior art processes is the that practiced by Hearthbrite Industries, Inc. ("Hearthbrite"). Using what was referred to as the Redmar process, the Hearthbrite product line included fuel and building products made from wood fiber and/or other forms of biomass and nontoxic thermoplastics. The fuel product was a firelog that could be burned in a fireplace as a wood substitute. The building material was sold in many forms to include landscape ties.

These prior art processes have several disadvantages that are addressed by the present invention. First, each process typically requires the formation of a mixture of thermoplastic component and filler material that must be continuously transported to the next step in the method. It would be desirable to store a quantity of the mixture in order to isolate the manufacturing process from any interruptions in the supply of either the wood component or the thermoplastic material. However, if the two component mixture is allowed to sit at rest it will quickly stratify due to the significant difference in bulk density in the two components. The relatively fine wood component filters through the relatively porous thermoplastic component and settles out of the mixture. It would be extremely impractical and require costly additional equipment to continuously mix the two components.

Another disadvantage of many of the prior art methods arises from the typical need to form a high temperature agglomeration or encapsulated mass from the input material. It is highly impractical and difficult matter to handle this mass. Storage in bulk with continued heating but without agitation can cause the formation of a solidly fused, non-transportable mass. Storage in bulk without continued heating or agitation may cause agglomerates in the mass to separate by size. However, continued stirring could well cause further agglomeration. Also, any significant change to the nature of the thermoplastic component entering the process may require a change in the temperature setting of the storage vessel. During the resulting time lag until the desired temperature is reached, the physical characteristics of the finished product could be unacceptably altered. Prolonged exposure to melting temperatures can give the thermoplastic component a heat history that may alter its molecular structure. Once altered that component may no longer be acceptable for use in a wood-thermoplastic composite.

Storing the components separately in sufficient quantity to operate a production line is possible. However, it is also impractical for safety and logistical reasons. Dust generated by the filler such as a finely ground wood component creates a potential explosion hazard mandating special handling considerations. Storing the thermoplastic component presents less of an explosion hazard. However, the extremely low bulk density of the thermoplastic flakes would require the use of a large storage facility to contain any useful quantity thereof.

Finally, these prior art methods are extremely susceptible to any type of system upset which disturbs or interrupts a steady state flow condition. Examples of system upsets include mechanical breakdown of components such as mixers or dryers that handle a hot agglomerated mass; breakdown of finished product handling equipment causing a pile up of finished product; failure of extrusion equipment heating or cooling systems causing extruder shutdown. Any of these upsets which are more than a momentary interruption requires the shutdown of the complete manufacturing line. Moreover, these methods have very limited ability to mitigate the effects of using an acceptable but not completely desirable thermoplastic or wood component.

SUMMARY OF THE INVENTION

The present invention is a method for producing a wood/thermoplastic composite material comprising:

(a) providing a wood component;

(b) reducing the wood component to a particle size of less than about 600 microns;

(c) providing a first thermoplastic component;

(d) reducing the first thermoplastic component to a particle size of less than about ¾ inch;

(e) proportioning the wood component and the first thermoplastic component in a weight percent ratio of wood component to thermoplastic component of from about 65/35 to about 40/60 to form a first wood/thermoplastic mixture;

(f) converting the first wood/thermoplastic mixture into a first stable non-separating high bulk density feedstock, wherein the first feedstock is capable of being readily air transported;

(g) repeating steps (a) through (f) to form a second stable non-separating high bulk density feedstock; the second high bulk density feedstock comprised of a second thermoplastic component having different physical characteristics from the first thermoplastic component;

(h) mixing the first feedstock and the second feedstock to form a blended high bulk density feedstock.

The present invention further includes forming a finished product using the blended high bulk density feedstock.

Creating a high bulk density feedstock according to this invention provides important advantages over prior art methods as discussed in more detail herein below. The feedstock may be stored so as to provide a surge capacity for the manufacturing process. The ability to continue to operate forming equipment despite an interruption of input material supply or equipment breakdown is a vast improvement over prior art methods which must be operated at full capacity or shut down completely. The storage feature also provides the ability to blend feedstocks. Blending is an important capability for a method that relies on the use of a recycled thermoplastic component as opposed to virgin material. The quality and suitability of recycled thermoplastic material can vary widely and directly impact the quality of the final product. The present invention comprehends making and storing a high bulk density feedstock made from a low quality thermoplastic material. The resulting low quality feedstock may then be blended with a high bulk density feedstock made from a high quality thermoplastic material having different physical characteristics to produce a satisfactory product.

Other advantages of the present invention include the ability to maintain a high level of product quality despite the use of input materials of varying quality. Consequently, the variance in product physical qualities from batch to batch will be very small. Composite materials made according to this process have very reproducible, predictable physical qualities.

The process of the present invention also permits manufacturers to control the color of their final products without the need to use expensive dyes. Often the recycled materials used in all processes of this type are characterized by being tinted a very strong color. The adverse effect of the tinted input material may not be detected until after the material has left the manufacturing facility and has been put to use. The present invention permits the storage and eventual blending off of a quantity of material so affected. Consumers of composite materials have high expectations for consistent product color. Accordingly, the ability to control color without the use of dyes affords the advantages of avoiding the costs of dye injection systems and providing a product the comes very close to the natural color of wood.

Therefore it is an object of this invention to provide a method for producing a wood-thermoplastic composite material using a stable, easily transportable, non-friable high bulk density feedstock.

It is another object of this invention to provide a method for producing a wood-thermoplastic composite material of consistently high quality from recycled materials having varying physical characteristics.

Still another object of this invention is the production of a wood-thermoplastic composite material without the use of expensive, heavy duty mixing and drying equipment.

Yet another object of this invention is to provide a method of blending varying quality high bulk density feedstocks to produce a consistent quality wood-thermoplastic composite material.

Another object of this invention is to provide a high bulk density feedstock in the form of durable, easy to transport, and non-friable pellets.

Still another object of this invention is to provide a method for making a high value product from very low value recycled thermoplastic and wood components.

Another object of this invention is to provide a process that products a composite material of consistent color by blending high bulk density feedstocks without the use of dyes.

Yet another object of this invention is to provide a process for making a composite material that is not sensitive to system upsets.

It is another object of this invention to produce a feedstock that can be stored prior to use and that can be formed into test samples of a final product before being put into production.

The foregoing and other objects, features and advantages of the invention will be better understood from the following more detailed description and appended claims. The accompanying drawings, which are incorporated in and constitute a part of the specification, illustrate one embodiment of the invention and, together with the description, serve to explain the principles of the invention.

DETAILED DESCRIPTION OF THE INVENTION

Figure 1:
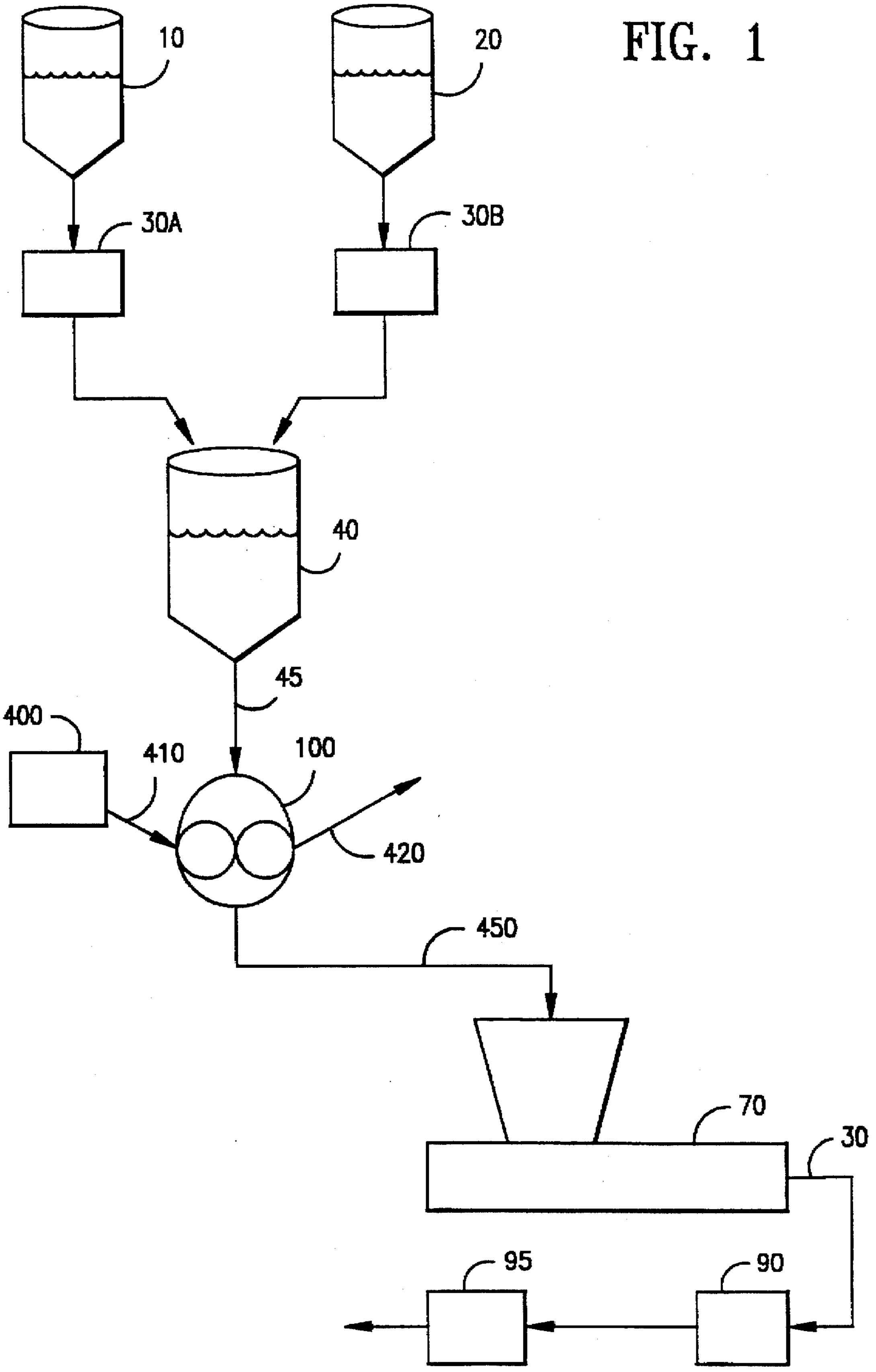
FIG. 1 is a schematic flow diagram of the method of the present invention.

Reference will now be made in detail to a present-preferred embodiment of the invention, an example of which is illustrated in the accompanying drawings. Turning now to FIG. 1, it can be seen that the starting materials for the method are a wood component 10 and a thermoplastic component 20. The potential sources for the wood component are extremely varied. Sources include but are not limited to sawdust available from furniture or pallet manufacturers. Another source for the wood component could be wood chips from a lumber yard or paper manufacturing facility. Both hardwood and soft wood sources are acceptable, however, a hardwood source is preferable. The wood component first undergoes a size reduction step 30*a*. A suitable means for this size reduction step is a hammer mill that renders the wood component to a preferable particle size of less than about 600 microns. The particle size can also be expressed in terms of the ability of the size reduced wood component to pass through a wire mesh sieve. In this case the particles should preferably pass through a size 30 mesh or smaller sieve. Prior to processing in the hammer mill the sawdust is passed by a strong magnet to remove metal fragments which could cause equipment failure and result in costly repairs and downtime. Moreover, those fragments may generate sparks in the hammer mill and other areas of the production line creating a potential explosion hazard. The present invention contemplates but is not limited to the wood component leaving the hammer mill having a bulk density of about 18 to about 22 lbs/ft$^3$. In a preferred embodiment the wood component has a bulk density of about 20 lbs/ft$^3$. The finely reduced wood component is then conveyed to a weigh system described below.

The thermoplastic component 20 used in the present invention must be carefully selected on the basis of melting point and other physical properties. Preferably the thermoplastic component 20 will have a melting point below about 150 degrees Centigrade. The melting point of the thermoplastic material should be low enough so as not to require extrusion temperatures sufficiently high to cause adverse reaction of the wood component. Exposing the wood component to high processing temperatures for extended periods may cause wood volatile components such as moisture, terpenes, and lignins to vaporize. As the vaporized components escape from the interior of the finished product dimensional distortion occurs. These vaporized components can also cause the formation of internal voids in finished products.

Another physical property that may be important to the selection of the thermoplastic component is melt index. Melt index is a well known parameter of thermoplastic materials and is defined as mass rate of material flow through a specified capillary under controlled conditions of temperature and pressure. Melt index is measured using the well known ASTM Method D 1238-90b, Condition 190/2.16. Typically thermoplastic materials having a low melt index have a higher molecular weight and materials having a high melt index have a low molecular weight. Materials having a relatively high melt index are generally less suitable for making a wood-thermoplastic composite because they can adversely affect final product strength and can make the extrusion process difficult to control.

Thermoplastic materials meeting these temperature and melt index characteristics may be used in the method of the present invention. However, the preferred thermoplastic component is some type of polyethylene. The origin and type of polyethylene can vary from post consumer waste to post industrial waste. However, in all cases the thermoplastic material should be as clean, free of debris and free of organic material as practicable. Wet material is generally unacceptable due to the large amount of heat required to eliminate the excess moisture. The present invention includes the use of high density polyethylene and low density polyethylene. In a preferred embodiment, the thermoplastic component is high density polyethylene. Sources of the thermoplastic component include post consumer recycled material such as used thermoplastic grocery bags and stretch wrap film. It is also possible to use off-specification polyethylene products not suitable for sale. Other potential sources of thermoplastic material include post-consumer recycled waste that has been cleaned and reduced to pellet form and virgin thermoplastic resin.

After receipt at the manufacturing facility, the thermoplastic component 20 is screened by hand and by a metal detector for metal fragments that could damage equipment. The thermoplastic component then goes to a size reduction step 30*b*. This size reduction is preferably carried out in a grinder where the thermoplastic material is reduced to uniform particles of less than about ¾ inch in size and having a relatively low bulk density. The thermoplastic component typically has a bulk density of about 3 lbs/ft$^3$ or less. However, other acceptable forms of the thermoplastic component could have a much higher bulk density. By way of non-limiting example, the bulk density of either virgin or recycled material thermoplastic pellets can be about 28 to about 35 lbs/ft$^3$. After the size reduction step, the thermoplastic component is fed to a weigh system.

The wood component and the thermoplastic component meet in the weigh system 40 where the initial commingling of the two components takes place. However, the primary purpose of the weigh system is to proportion the two components in a ratio that will create an acceptable product. A person of ordinary skill in the materials handling art will be familiar with methods for proportioning two components to achieve a particular proportion. As a non-limiting example, the weigh system could consist of a large hopper into which the two components are alternatively fed. Weight sensors track and control the cumulative amount of wood component and thermoplastic component allowed to enter the hopper. A control system determines the weight percent of each component in the mixture and thus the wood-thermoplastic ratio. The two components are measured in predetermined proportions or ratios to create an acceptable product. Variations on this basic concept will be apparent to a person of ordinary skill in the art. These variations may include metering the components into separate hoppers one for each component.

It will be apparent to persons of ordinary skill in the art that various modifications can be made in the component proportions of the present invention. For example, the proportion of wood component to thermoplastic component in the mixture is typically from about 65 weight percent wood component/35 percent thermoplastic component to about 40 weight percent wood component/60 percent thermoplastic component. In a preferred embodiment of the present invention a mixture of about 52 weight percent wood component/48 percent thermoplastic component is used. The bulk density of the wood-thermoplastic mixture will vary depending on the amount of each component therein but is typically about 10 lbs/ft$^3$ to about 15 lbs/ft$^3$. Desirably the mixture ratio bulk density is about 13 lbs/ft$^3$. It is within the expertise of one of ordinary skill in the art to vary the mixture ratio to optimize product properties. The practice of the present invention includes varying that ratio as necessary to account for differences in the makeup of the sawdust and thermoplastic material available.

In some prior art processes the proportioned wood-thermoplastic mixture would undergo a drying step to reduce the moisture content thereof. This step may then be accomplished by one or a series of heaters. Next the dry mixture is fed to a mixing or agglomerating step where heat energy is added to the mixture to melt the thermoplastic particles so as to encapsulate the wood component. This homogenous mass may then be size reduced and fed to an extruder or some other type of forming equipment. The encapsulated mass type process is typified by the inventions disclosed in U.S. Pat. Nos. 5,082,605 and 5,088,910 mentioned herein above. The assignee of the present invention has practiced a different process that does not involve the use of an encapsulated mass.

The present invention incorporates the novel step of converting the output from the weigh system 45 into a high bulk density (HBD) feedstock. This step may be carried out in a high capacity pellet mill 100. The pellet mill is a well known means to increase material bulk density. However, in the present invention the pellet mill is put to novel use to form a compact feedstock from two dissimilar components having widely disparate bulk densities. The pellet mill eliminates the material handling problems described herein above and provides a degree of flexibility previously available only to processors of virgin materials. It has been found that a suitable pellet mill for the practice of the present invention is the Model C-3016 manufactured by the California Pellet Mill Company.

Use of the pellet mill radically changes the nature of making a wood-thermoplastic composite. The wood and thermoplastic components are compacted or compressed into stable, non-friable pellets that have a greatly increased bulk density. A properly operating pellet mill will produce substantially uniform pellets that self-compact when introduced into a container. By self-compact it is meant that if a quantity of pellets are poured into a container, they will stack and flow freely to conform fully to the container's shape. Tapping or agitating the container will result in little if any additional settling of the pellets. The scope of the present invention includes but is not limited to making pellets of generally cylindrical shape. The pellets can range in size from about 1/16 inch to about 1/4 inch in diameter and from about 3/8 inch to about 1/2 inch in length. This range of pellet sizes is not intended to be a limitation on the present invention. As will be apparent to those versed in the art, other pellet configurations and sizes may be utilized. The HBD feedstock of the present invention will desirably have a bulk density of about 5 times to about 10 times that of the thermoplastic component alone and at least about 2 times to 3 times that of the wood/thermoplastic mixture. The practice of the present invention also includes creating a HBD feedstock having a bulk density suitable for efficient processing into a finished product using standard forming techniques such as extrusion. The bulk density of the feedstock is typically about 25 $lbs/ft^3$ to about 39 $lbs/ft^3$. In a preferred embodiment the feedstock bulk density will be about 28 $lbs/ft^3$ to about 32 $lbs/ft^3$. Bulk densities in these ranges enable forming processes such as extrusion to be carried out very efficiently. Part of that efficiency increase comes about from the fact that the variation in bulk density of the material being fed into the processing equipment will be much smaller using the pelletized feedstock as compared to prior art processes. Bulk density variation can cause surging problems in extrusion equipment. Surging causes unacceptably large swings in flow rate and leads to extruder barrel overheating or underheating.

On average, a large quantity of HBD feedstock will have approximately the same wood-thermoplastic weight percent ratio of the mixture fed into the pellet mill. In other words, if all the pellets in such a quantity were separated into their constituent parts, the parts would be present in weight percent ratios close to that disclosed for the mixture described herein above. However, individual pellets may be composed substantially of either component and thus could have far different wood-thermoplastic weight percent ratios from that of the larger quantity. The pellets are therefore unlike the encapsulated homogenous mass sometimes used in the prior art patents cited herein. There is no uniform dispersion of the wood fiber within a continuous phase of plastic material. Pellets made according to the present invention may be broken open to reveal unaltered, tightly compressed fragments of the thermoplastic component in intimate contact with tightly compressed wood component.

The pelletized HBD feedstock greatly simplifies material handling requirements. As will be apparent to a person of ordinary skill in the art of bulk material handling, there are many economical methods available for transporting a pelletized feedstock. For example, the tough, free flowing pellets may be air transported through transport tubes quite easily using either a vacuum system or a pressurized air system or a combination of the two. The pellets are also suitable for mechanical forms of bulk material transport such as screw conveyors. The feedstock may be very economically moved from the pellet mill to storage and from storage to processing equipment. The pellets have a much smaller tendency to clog transport tubes. The pellets are also durable and resistant to disintegration or breakage.

It has been observed that formation of the pellets is assisted by a glaze or polish that forms on the surface thereof. This glaze is a byproduct of the compressive forces generated inside the pellet mill. In very high volume operations where a great deal of heat is generated during the pelletizing process, it may be necessary to incorporate a pellet cooler to control the glazing on the outside of the pellets. It is well within the capability of one of ordinary skill in the art to determine when a cooler would be required. This glaze formation should be distinguished from the addition of sufficient heat to cause an actual melting of the thermoplastic component to the extent that it encapsulates the wood component. The process of the present invention includes introducing little or no heat history into the thermoplastic component during the conversion of the wood-thermoplastic mixture into a HBD feedstock.

The pellet mill used in this method desirably may be modified with a ventilation system 400 that provides an air stream 410 through the pellet mill during operation. The system also removes wood and thermoplastic component fines generated during the pelletizing process. The fines 420 contained in the air stream are routed back into the process. It is believed that the use of the air stream in the pellet mill not only performs a cooling function but also creates a better defined pellet. In a preferred embodiment the pellets will have a cylindrical shape with substantially smooth top and bottom ends with the ends perpendicular to the upright wall of the pellet.

It must be understood that either the wood or the thermoplastic component could be pelletized separately for the manufacture of a composite material. However, that approach presents some practical difficulties and is not considered the most advantageous method to practice the present invention. With respect to pelletizing the wood component alone, material throughput rates decrease significantly in the same size machine suitable for pelletizing a wood-thermoplastic mixture. Accordingly, larger, more expensive equipment could be required to pelletize the wood component. Pelletizing the thermoplastic component or any other material containing a very large amount (90% and higher) of thermoplastic material can be difficult. Industry efforts to do so have been deterred due to a tendency of the thermoplastic material to melt and superlubricate the rolling members of the pelletizing equipment. The extremely high temperatures generated therein cause the formation of large clumps of molten material inside the pelletizers. If that material is allowed to solidify, the pelletizer can be almost impossible to disassemble and clean. Such problems would be encountered in attempting to pelletize the thermoplastic material described in U.S. Pat. No. 5,268,074 mentioned above. The method disclosed therein contemplates creating a plastic pellet having from about 95 to about 90 weight percent thermoplastic material and would be highly susceptible to the problem just described.

It has been observed that pelletizing the wood-thermoplastic mixture takes advantage of the best properties of both components. The thermoplastic component acts as a lubricant but not to the extent of causing overheating and melting. The wood component creates sufficient friction to counter the thermoplastic lubrication. Together the two components form a well-defined, substantially uniform pellet with far better results than expected.

The pelletizing step can replace the heating and drying steps as they are practiced in the prior art with a single step. Prior art processes typically require the use of expensive, energy intensive dryers and/or mixers. The heat generated during the pelletizing process can drive off moisture from the wood-thermoplastic mixture. The practice of the present invention includes creating a HBD feedstock having as low a moisture content as possible. The preferred moisture content of the feedstock as it leaves the pelletizer is about 5 percent or less. Higher moisture content levels are tolerable but not desirable. Additional processing steps to dry the feedstock will be required as its moisture content increases.

From the pelletizer 100 the HBD feedstock is fed to a forming step where it is formed into a finished product. The present invention includes any forming step suitable for a wood-thermoplastic composite material. Typical examples include extrusion and injection molding. The extruders used for this process must be suitable for use with a wood-polymer composite. In the extruder the mixture is heated to a temperature suitable for extrusion into a profile. For a high bulk density feedstock having about 52 weight percent wood component and 48 weight percent thermoplastic component, an extrusion temperature of about 300 degrees Fahrenheit may be used. It is in the extruder that the thermoplastic material becomes completely melted and mixed with the wood component. As the mixture travels through the extrusion step it is compressed, forced through a die, and takes on the shape of the desired profile 80. A profile is defined in this art as an article fabricated from the composite material, which has a random length and consistent cross section. From the extruder the profile moves on to a cooling step 90 and optionally to any special sizing or machining 95 required for a given application. The cooling is typically accomplished by conveying the composite material through a water bath system.

In FIG. 1 the feedstock 450 is fed directly to an extruder 70. Other types of forming equipment or processes may be used as is well known to those of ordinary skill in the art. This is the most direct method of practicing the present invention, however, it does utilize the full range of options made available by the creation of the HBD feedstock. These options are described in the discussion of FIGS. 2–4 below.

Figure 2:
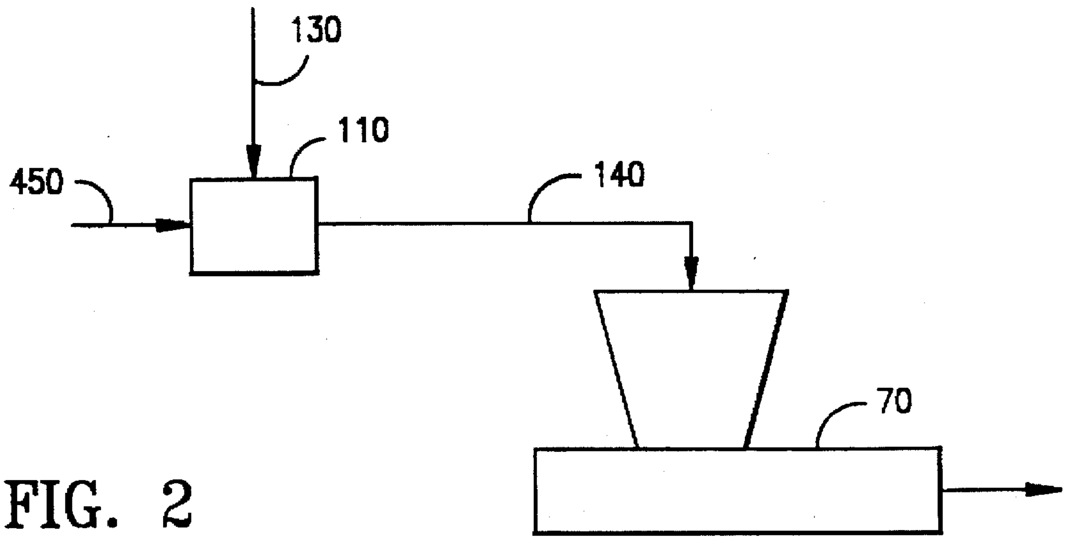
FIG. 2 is a schematic flow diagram showing an additional processing step used prior to forming a high bulk density feedstock into a final product.

An alternative path for the feedstock is shown in FIG. 2 where the feedstock 450 is fed to an additional processing step 110. Typically this additional processing could include the addition of colorants/additives 130 for a particular application. One other type of additional processing step may be desired. It should be noted that the pellets are quite hygroscopic when formed and prior to extrusion. The wood fiber is not encapsulated in a polymer matrix prior to extrusion. Consequently, the pellets may absorb ambient moisture while in storage. Accordingly, it is within the scope of the present invention to utilize a drying step for a feedstock transported from storage to processing. Such a drying step may be carried out very efficiently on the HBD feedstock in a suitable commercial dryer adapted for use with a pelletized material and capable of reducing the moisture level therein to less than about 5%. This step would also serve to preheat the feedstock. Alternatively, the storage area may be blanketed with a dry gas to prevent moisture adsorption. The dry feedstock 140 is then formed into the desired product at 70.

Figure 3:
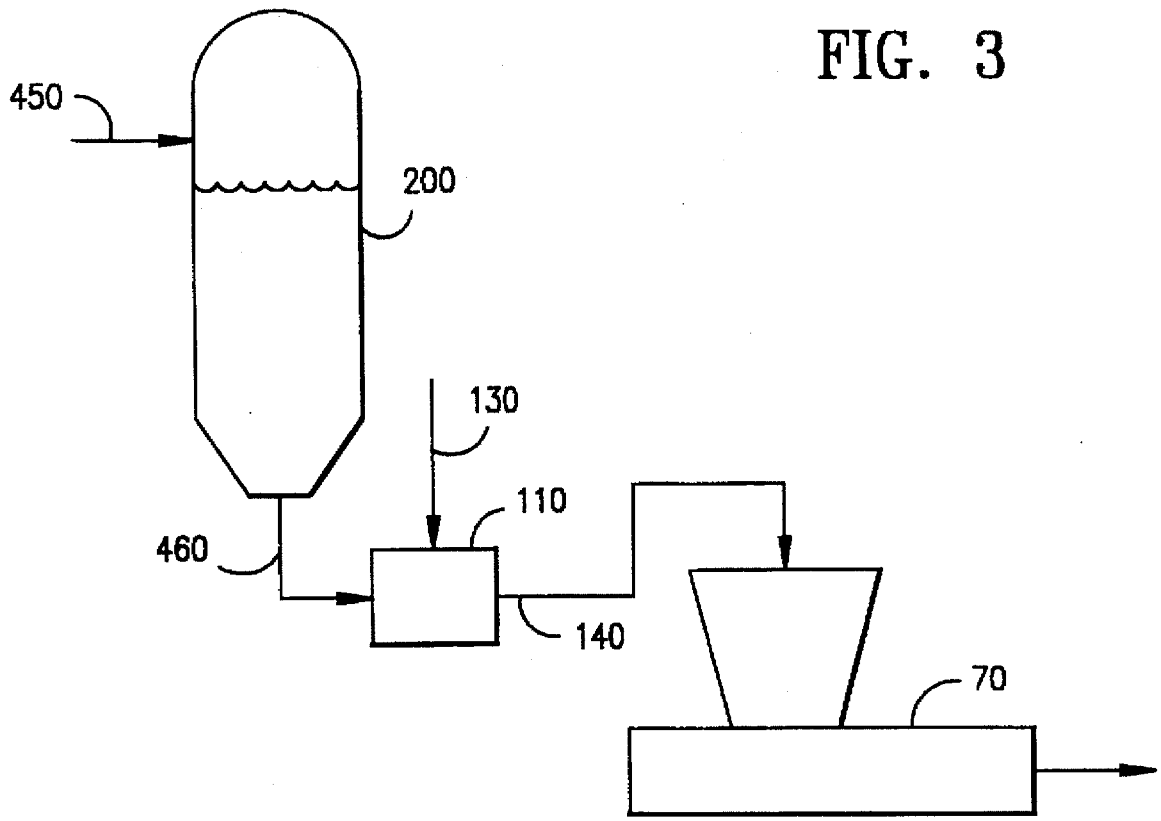
FIG. 3 shows the present process is use with a storage area for a high bulk density feedstock.

Another embodiment of the present invention is illustrated in FIG. 3 which shows the output 450 of the pellet mill being directed to a storage area 200. This storage area may contain a feedstock manufactured from a particular wood/thermoplastic combination or a particular mixture ratio. Although a single storage area is shown, it will be readily seen by a person of ordinary skill in the art that a plurality of storage areas may be provided to greatly increase processing capabilities and options. The advantages of this storage feature are explained more fully herein below. From storage 200 the feedstock 460 can be returned directly to a forming process such as extrusion 70. Preferably the feedstock 460 is fed to the additional material preparation step 110 as described above.

Figure 4:
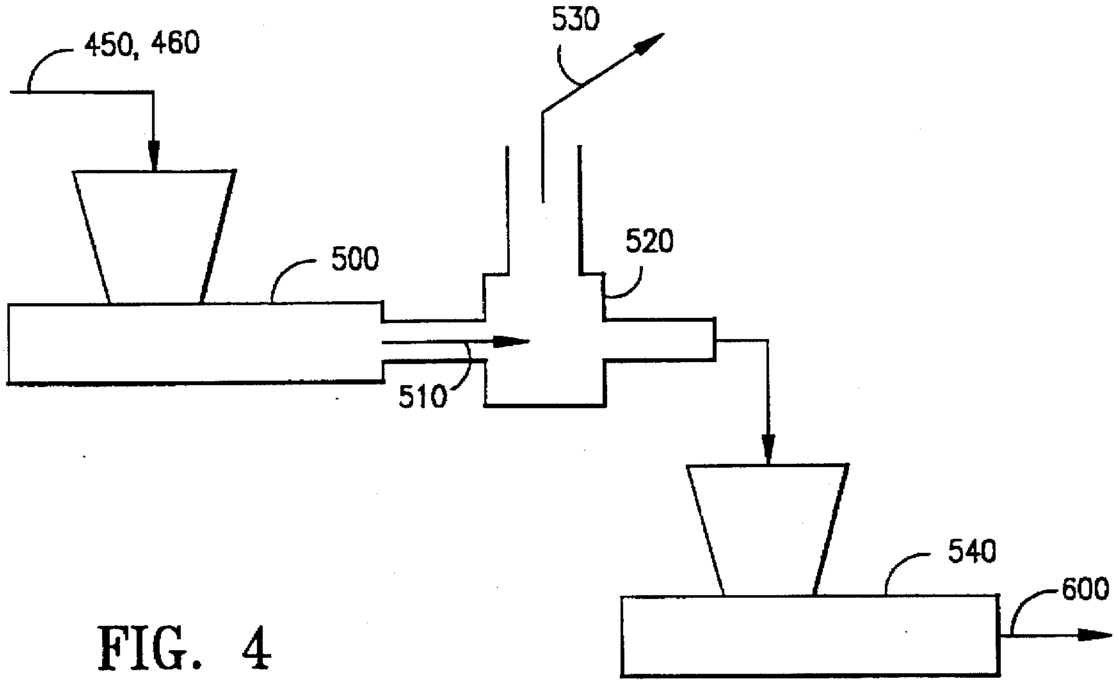
FIG. 4 is an illustration of an extrusion-vacuum-extrusion embodiment of the present invention.

Turning to FIG. 4 yet another embodiment of the present invention is depicted. Here the additional processing step of drying the feedstock has been eliminated through the use of a two stage extrusion process. In this embodiment the input feedstock may come directly from the pellet mill 450 or from storage 460 or preferably may be a blend of the two. Assuming that no special colorant or additive is desired, the feedstock may be fed directly into a first extrusion step 500. The purpose of this first extrusion step is to heat and plasticize the feedstock. The extrudate 510 is raised to a sufficiently high temperature such that the volatiles contained therein will readily escape if allowed the opportunity. That opportunity is provided at 520 where the extrudate is fed to a vacuum zone 520 where volatiles 530 contained in the extrudate are pulled out. From the vacuum zone 520 the extrudate is fed to a second extrusion step 540 where it is then reheated and forced through a die to form a final profile 600.

As discussed herein above, volatiles contained in the wood component can cause distortion of the final profile as they attempt to boil to the surface of the profile as it exits the die. At least some portion of the total volume of those volatiles is made up of moisture. It is believed that a strong vacuum applied during a two stage extrusion process can remove a sufficient quantity of both the residual moisture and chemical volatiles (terpenes and lignins) contained in the feedstock to preclude the need for preheating or drying the feedstock.

This process may not be economically feasible for input materials having extremely high moisture levels. However, where feasible, it will radically reduce the need for expensive, energy intensive processing equipment. Although four embodiments of practicing the present invention have been disclosed herein, it will be obvious to a person of ordinary skill in the art to combine the steps of pelletizing, storage, drying (if necessary) and forming to create products with a variety of physical characteristics. More importantly, it will be possible to maintain consistent product quality and appearance despite variances in both the quantity and quality of available input materials.

The present invention has several advantages over prior art methods for making a wood/thermoplastic composite. One of the most important is the ability to store large quantities of the HBD feedstock so as to build in a surge capacity in the manufacturing process. As stated above, the durable pelletized HBD feedstock may be transported to storage facilities in sufficient quantities to operate a production line for a time despite disruptions caused by equipment malfunctions upstream of the pelletizer or by interruption of the sawdust or thermoplastic material supply. Suitable storage facilities can be built economically because no special utilities are required to maintain the feedstock in usable condition. In stark contrast, the methods disclosed in the prior art (U.S. Pat. Nos. 5,082,605 and 5,088,910) require the creation of a high temperature, homogenous mass that must be heated continuously prior to forming into a final product. Storing that mass is an impractical undertaking. First, expensive utilities would be required to maintain the mass at an encapsulation temperature. Second, long term exposure to heat will impart a heat history to the thermoplastic component thereby changing its properties. Lastly, if the mass is stored and allowed to cool, there can be significant material handling problems involved with reheating and transporting the mass to forming equipment.

As discussed herein above, should the feedstock absorb moisture from the atmosphere as it sits in temporary storage, it can be preheated and dried prior to processing. Alternatively the storage facilities may be ventilated to maintain more desirable conditions therein. The need for such additional steps will depend on a number of factors to include ambient conditions at the manufacturing facility, the length of time pellets are left in storage before being processed, and the availability of auxiliary processing equipment. It should be noted that moisture can be removed from the feedstock much more efficiently than from the bulky, difficult to handle wood/thermoplastic mixture. The pelletizing step allows that energy input to be carried out much more efficiently.

An extremely important ramification of the storage aspect described above is the resulting ability to blend different types of pelletized feedstock. The manufacturer of this type of composite material who relies on recycled post-consumer thermoplastic material must deal with a stream of input material having a constantly variable level of quality. The two facets of this problem are the quality variance of acceptable input materials and temporary input material variance far outside acceptable limits. In this situation, the practioner of the prior art processes is limited to the options of halting production, scrapping a potentially significant amount of product or attempting to vary process conditions during production to compensate for input material characteristics. Each of these options can be extremely expensive or result in the production of a product of inferior quality. In contrast the process of the present invention permits a manufacturer to store a first batch of this lower quality feedstock. Later as more desirable input material having different physical properties becomes available, a second batch of feedstock of higher quality may be manufactured and blended with the first batch. The blended feedstock may then be formed into a finished product. Proper blending rates may readily be determined by one of ordinary skill in the art. Emphasis can be placed on maintaining consistent production parameters and quality independently of input material characteristics. Also advantage can be taken of lower cost input materials that would not be usable in other than in a blended product feedstock. These advantages are not available with any of the prior art methods.

The blending capability also provides a process for continuing production in the face of a temporary shortage of either the wood component or the thermoplastic component. A feedstock having a high percentage of either component well over the ranges described herein could be made on a temporary basis. That high percentage feedstock could then be blended with feedstock from storage to achieve a blended feedstock having acceptable amounts of each component.

It should be noted that the blending capability discussed so far can also address the ability to control the color of a composite material. Dyes may be added to composite materials to achieve a particular color but at the penalty of added cost. Moreover, for many situations a product which matches the natural color of wood is desired. Some recycled materials such as plastic grocery bags have very strong coloring which has been known to affect the color of composite products made therefrom. The blending capability of the present invention enables the effect of such coloration of input materials to be diluted to the point that the final products are unaffected.

The blending described above can be utilized not only to avoid problem thermoplastic components but also to create new products having unique physical characteristics. By varying the proportion of wood component to plastic component and the addition of additives, products may be custom configured for particular applications.

As feedstock waits in storage for transport to a final forming step, samples may be drawn for the creation of test bars of the final product. Thus, a manufacturer may determine that particular batch of feedstock meets quality standards and failing that will have an opportunity to correct the condition prior to final use of the feedstock. The testing results can also be used to fine tune blending formulas.

Yet another advantage of the present invention lies with the present need to site wood-thermoplastic composite plants in the close proximity to a sawdust supply source. (Sourcing of the thermoplastic component tends not to be as location sensitive.) The use of a pelletizer to create a high bulk density feedstock provides greater independence in this respect because the wood and thermoplastic components may be mixed and pelletized at multiple locations close to material sources. The feedstock could then be shipped to a central manufacturing facility for forming into a final product.

Although the present invention has been described with preferred embodiments, it is to be understood that modifications and variations may be utilized without departing from the spirit and scope of this invention, as those skilled in the art will readily understand. Such modifications and variations are considered to be part of the invention, provided they come within the scope of the appended claims and their equivalents.

What is claimed is:

1. A method for producing a wood/thermoplastic composite material comprising:

(a) providing a wood component;

(b) reducing said wood component to a particle size of less than about 600 microns;

(c) providing a first thermoplastic component;

(d) reducing said first thermoplastic component to a particle size of less than about ¾ inch;

(e) proportioning said wood component and said first thermoplastic component in a weight percent ratio of wood component to thermoplastic component of from about 65/35 to about 40/60 to form a wood-thermoplastic mixture;

(f) pelletizing said wood-thermoplastic mixture into a first stable non-separating high bulk density feedstock, wherein said first feedstock is capable of being readily air transported;

(g) repeating steps (a) through (f) to form a second stable non-separating high bulk density feedstock; wherein said second high bulk density feedstock is comprised of a second thermoplastic component having different physical characteristics from said first thermoplastic component;

(h) mixing said first feedstock and said second feedstock to form a blended high bulk density feedstock.

2. The method of claim 1 further comprising drying said blended feedstock to a moisture level of less than about 5% and forming said blended high bulk density feedstock into a finished product.

3. The method of claim 1 wherein said pelletizing forms stable non-friable pellets of substantially uniform size and shape.

4. The method of claim 3 wherein said pelletizing step increases the bulk density of said first high bulk density feedstock and said second high bulk density feedstock to at least about 2 times to 3 times that of said wood-thermoplastic mixture.

5. The method of claim 4 wherein said first high bulk density feedstock and said second high bulk density feedstock each have a bulk density of from about 25 $lbs/ft^3$ to about 39 $lbs/ft^3$.

6. The method of claim 5 wherein said first high bulk density feedstock and said second high bulk density feedstock each have a bulk density of about 28 $lbs/ft^3$ to about 32 $lbs/ft^3$.

7. The method of claim 3 wherein said pellets have a generally cylindrical shape.

8. A method for making a wood-thermoplastic composite material comprising:

(a) proportioning a wood component and a first thermoplastic component in a wood-thermoplastic weight percent ratio of from about 65/35 to about 40/60 to form a first wood-thermoplastic mixture;

(b) pelletizing said first wood-thermoplastic mixture into a first high bulk density feedstock;

(b) transporting said first high bulk density feedstock to storage;

(c) proportioning a wood component and a second thermoplastic component in a wood-thermoplastic weight percent ratio of from about 65/35 to about 40/60 to form a second wood-thermoplastic mixture; said second thermoplastic component having different physical characteristics from that of said first thermoplastic component;

(d) pelletizing said second wood-thermoplastic mixture into a second high bulk density feedstock;

(e) blending said first high bulk density feedstock and said second high density feedstock to form a blended high bulk density feedstock.

9. The method of claim 8 further comprising forming said blended high bulk density feedstock into a finished product.

10. The method of claim 9 further comprising drying said blended feedstock after said blending step and before said forming step.

11. In a process for making a wood/thermoplastic composite material comprising the steps of providing a wood component, size reducing the wood component, providing a thermoplastic component, size reducing the thermoplastic component, proportioning the wood component and thermoplastic components in a mixing ratio to form a wood/thermoplastic mixture having a bulk density of about 13 $lbs/ft^3$, drying the mixture, heating the mixture and extruding the mixture into a finished product, the improvement comprising:

(a) pelletizing the wood-thermoplastic mixture to form a stable non-friable high bulk density feedstock; said feedstock being capable of being stored for later use.

12. The improvement of claim 1 further comprising forming said high bulk density feedstock into a finished product.

13. The improvement of claim 11 wherein said pelletizing forms pellets of substantially uniform size and shape.

14. The improvement of claim 13 wherein said pelletizing increases the bulk density of said high bulk density feedstock to 2 times to 3 times that of said wood/thermoplastic mixture.

15. The improvement of claim 14 wherein said high density feedstock has a bulk density of about 25 $lbs/ft^3$ to about 39 $lbs/ft^3$.

16. The improvement of claim 14 wherein said high density feedstock has a bulk density of about 28 $lbs/ft^3$ to about 32 $lbs/ft^3$.

17. The improvement of claim 13 wherein said pellets have a generally cylindrical shape.

18. The improvement of claim 11 further comprising (a) making a first batch of said feedstock;

(b) transporting said first batch to storage;

(c) making a second batch of said feedstock; wherein said second batch contains a thermoplastic component having different physical characteristics from said thermoplastic component contained in said first feedstock;

(d) blending said first batch and said second batch to form a blended feedstock.

19. The improvement of claim 18 further comprising forming said blended feedstock into a finished product.

20. A method for producing a wood/thermoplastic composite material comprising:

(a) providing a wood component having a particle size of less than about 600 microns;

(b) providing a first thermoplastic component; wherein said thermoplastic component has a particle size of less than about ¾ inch;

(c) proportioning said wood component and said first thermoplastic component in a weight percent ratio of wood component to thermoplastic component of from about 65/35 to about 40/60 to form a wood-thermoplastic mixture;

(e) pelletizing said wood-thermoplastic mixture into a first stable non-friable high bulk density feedstock, wherein said first feedstock is capable of being readily air transported;

(f) repeating steps (a) through (f) to form a second stable non-separating high bulk density feedstock;

(g) mixing said first feedstock and said second feedstock to form a blended high bulk density feedstock.

21. The method of claim 20 further comprising forming said blended high bulk density feedstock into a finished product.

* * * * *